(12) United States Patent
Rapoport et al.

(10) Patent No.: US 12,508,084 B2
(45) Date of Patent: *Dec. 30, 2025

(54) SYSTEMS AND METHODS FOR HIGH-BANDWIDTH MINIMALLY INVASIVE BRAIN-COMPUTER INTERFACES

(71) Applicant: PRECISION NEUROSCIENCE CORPORATION, New York, NY (US)

(72) Inventors: Benjamin Isaac Rapoport, New York, NY (US); Demetrios Philip Papageorgiou, Weston, MA (US); Mark James Hettick, Fremont, CA (US)

(73) Assignee: PRECISION NEUROSCIENCE CORPORATION, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/956,834

(22) Filed: Nov. 22, 2024

(65) Prior Publication Data

US 2025/0082414 A1 Mar. 13, 2025

Related U.S. Application Data

(62) Division of application No. 17/810,768, filed on Jul. 5, 2022.

(Continued)

(51) Int. Cl.
*A61B 34/20* (2016.01)
*A61B 6/03* (2006.01)
(Continued)

(52) U.S. Cl.
CPC ............... *A61B 34/20* (2016.02); *A61B 6/03* (2013.01); *A61B 6/501* (2013.01); *A61B 6/504* (2013.01);
(Continued)

(58) Field of Classification Search
CPC ...... A61N 1/05; A61N 1/0551; A61N 1/0534; A61N 1/0529; A61N 1/36117;
(Continued)

(56) References Cited

U.S. PATENT DOCUMENTS 9,814,885 B2 11/2017 Molnar et al.
9,867,978 B1 1/2018 Rapoport et al.
(Continued)

FOREIGN PATENT DOCUMENTS

CA 3038970 A1 4/2018

OTHER PUBLICATIONS

Nett, "How Fluoroscopy Works | Indications and Physics of X-ray Fluoroscopy", How Radiology Works, https://howradiologyworks.com/how-fluoroscopy-works-indications-and-physics-of-x-ray-fluoroscopy/, retrieved from the Internet Feb. 5, 2025, 8 pages, (2024).

(Continued)

*Primary Examiner* — Joseph A Stoklosa
*Assistant Examiner* — Brian M Antiskay
(74) *Attorney, Agent, or Firm* — DLA Piper LLP US (57) ABSTRACT

Systems and methods for high-bandwidth, minimally invasive brain-computer interfaces (BCIs) are disclosed. The BCIs are configured for deployment and operation in conjunction with a comprehensive interventional electrophysiology procedural suite. Three primary methods of minimally invasive electrode array delivery are disclosed: (1) cortical surface delivery, (2) ventricular delivery, and (3) endovascular delivery. Additionally, systems and methods for interacting with such high-bandwidth electrode arrays are discussed, including real-time imaging, signal processing, and neural decoding. Systems and methods for architectures for accelerating the underlying computational processes (such as graphics processing units or tensor processing units) are (Continued)

also discussed. Multiple applications of BCIs are discussed, with emphasis on restoration, rehabilitation, and augmentation of neurologic function.

17 Claims, 8 Drawing Sheets

Related U.S. Application Data

(60) Provisional application No. 63/218,063, filed on Jul. 2, 2021.

(51) Int. Cl.
*A61B 6/50* (2024.01)
*A61B 90/10* (2016.01)
*A61N 1/05* (2006.01)
*A61N 1/36* (2006.01)

(52) U.S. Cl.
CPC ............ *A61B 90/10* (2016.02); *A61N 1/0531* (2013.01); *A61N 1/36046* (2013.01); *A61N 1/36064* (2013.01); *A61N 1/36067* (2013.01); *A61B 2090/101* (2016.02)

(58) Field of Classification Search
CPC .............. A61N 1/36071; A61N 1/0531; A61N 1/0539; A61N 1/36082; A61N 1/36053; A61N 1/0526; A61N 1/36021; A61N 1/36025; A61N 1/0504; A61N 1/3606; A61N 1/36185; A61N 1/36003; A61N 1/37514; A61N 2/008; A61N 1/04; A61N 1/36064; A61B 5/369; A61B 2562/125; A61B 5/316; A61B 5/0006; A61B 5/4041; A61B 5/31; A61B 5/6814; A61B 5/4064; A61B 17/3468; A61B 34/20; A61B 5/0215; A61B 5/372; A61B 5/6868
USPC ................ 600/372–374, 377–378, 544–545; 607/115–118
See application file for complete search history.

(56) References Cited

U.S. PATENT DOCUMENTS

| | | |
|---|---|---|
| 10,426,968 B2 | 10/2019 | Casse et al. |
| 2008/0132980 A1* | 6/2008 | Gerber ................. A61N 1/0534 607/116 |
| 2010/0130844 A1 | 5/2010 | Williams et al. |
| 2011/0201944 A1 | 8/2011 | Higgins et al. |
| 2013/0066397 A1 | 3/2013 | Shivdasani et al. |
| 2016/0095535 A1 | 4/2016 | Hettrick et al. |
| 2017/0007824 A1 | 1/2017 | Gardner et al. |
| 2017/0348049 A1 | 12/2017 | Vrba et al. |
| 2018/0078767 A1 | 3/2018 | Rapoport et al. |
| 2018/0117309 A1 | 5/2018 | Rapoport et al. |
| 2018/0117331 A1 | 5/2018 | Kuzniecky et al. |
| 2019/0329026 A1 | 10/2019 | Rapoport et al. |
| 2020/0000410 A1* | 1/2020 | Van Niekerk .......... A61B 5/287 |
| 2020/0016396 A1 | 1/2020 | Yoo |
| 2020/0289012 A1 | 9/2020 | Rapoport et al. |
| 2020/0289061 A1 | 9/2020 | Rapoport et al. |
| 2022/0143396 A1 | 5/2022 | Rapoport et al. |
| 2022/0167924 A1 | 6/2022 | Rapoport |
| 2022/0167925 A1 | 6/2022 | Rapoport |
| 2023/0201574 A1 | 6/2023 | Rapoport et al. |
| 2023/0320665 A1 | 10/2023 | Patsalides |
| 2023/0380766 A1 | 11/2023 | Rapoport |

OTHER PUBLICATIONS

Gringold, "Modern Fluoroscopy Imaging Systems", Thomas Jefferson University, https://www.imagewisely.org/-/media/ImageWisely/Files/Fluoro/Gingold--Modern-Fluoroscopy-Imaging-Systems. pdf, retrieved from the Internet Feb. 5, 2025, (2010).
Examination Report No. 1 for Australian Patent Application No. 2022303400 dated Oct. 7, 2024, 3 pages.
Extended European Search Report for Application No. 22834347.1 dated Feb. 5, 2025, 10 Pages.
International Search Report and Written Opinion for International Application No. PCT/US2022/036094, mailed Nov. 22, 2022, 10 Pages.
Office Action for European Patent Application No. 22834347.1, mailed Feb. 25, 2025, 1 page.
Office Action for Indian Patent Application No. 202417004876, mailed Sep. 29, 2025, 6 pages.
Notice of Acceptance for Australian Patent Application No. 2022303400, mailed on Oct. 9, 2025, 3 pages.

* cited by examiner

SYSTEMS AND METHODS FOR HIGH-BANDWIDTH MINIMALLY INVASIVE BRAIN-COMPUTER INTERFACES

CROSS-REFERENCE TO RELATED APPLICATIONS

This application is a divisional of U.S. patent application Ser. No. 17/810,768, titled SYSTEMS AND METHODS FOR HIGH-BANDWIDTH MINIMALLY INVASIVE BRAIN-COMPUTER INTERFACES, filed Jul. 5, 2022, which claims the benefit of priority to U.S. Provisional Application No. 63/218,063, titled SYSTEMS AND METHODS FOR HIGH-BANDWIDTH MINIMALLY INVASIVE BRAIN-COMPUTER INTERFACES, filed Jul. 2, 2021, which are incorporated herein by reference in their entireties.

TECHNICAL FIELD

The present disclosure relates generally to high-bandwidth neural interfaces. More particularly, the present disclose relates to procedural suites and methods of use thereof that enable the insertion and placement of high-bandwidth neural interfaces to a target area of the brain, e.g., the temporal lobe, the visual cortex, and/or additional anatomical locations. The disclosed techniques may be applied to, for example, insertion of an electrode interface to treat epilepsy, blindness, paralysis, stroke, impulse control disorders, and other conditions relating to the electrophysiology of the brain.

BACKGROUND

Brain-computer interfaces (BCIs) rely upon neural recording and stimulation techniques. Neural recording and stimulation techniques often involve design trade-offs among (1) spatial resolution, (2) temporal resolution, (3) degree of invasiveness and collateral damage to normal brain tissue, and (4) optimization for electrical recording and/or electrical stimulation.

Conventional techniques for recording and/or stimulating the nervous system face many challenges. For example, imaging techniques such as magnetic resonance imaging (MRI) and computed tomography (CT) provide non-invasive methods for examining brain tissue. However, these non-invasive imaging techniques are unable to detect all functional lesions and lack temporal resolution. Furthermore, these techniques may not be adequate for imaging electrical activity in the nervous system and lack a mechanism for therapeutic electrophysiologic intervention.

Electromagnetic recording techniques such as electroencephalography (EEG) and magnetoencephalography (MEG) are non-invasive and provide temporal resolution of electrical activity in the brain. However, the resolution of such techniques is limited, due to both the physical distance separating the electrodes from the brain and the dielectric properties of the scalp and skull. Accordingly, conventional recording of neural activity lacks adequate spatial resolution for some applications.

Additional techniques such as electrocorticography (ECoG) or intracranial EEG include forms of electroencephalography that offer improved spatial resolution by placing electrodes directly onto the cortical surface of the brain. However, the improved spatial resolution is conventionally achieved only by way of a highly invasive surgical procedure, a craniotomy, which requires the temporary surgical removal of a significant portion of the skull.

Yet another technique for recording and/or stimulating the nervous system involves the use of depth electrodes, which are capable of recording electrical activity in the nervous system with high spatial and temporal resolution. However, conventional depth electrodes are only able to record from a small volume of tissue or a small population of neurons. Additionally, the placement of depth electrodes is highly invasive and may result in damage or destruction of normal brain tissue including neurons. As such, only a limited number of depth electrodes may be placed safely and there is limited ability to adjust the spatial placement of the electrodes after initial placement, except for minor depth adjustments during placement.

Yet another technique for recording and/or stimulating the nervous system involves deep brain stimulation (DBS) electrodes, which may be configured to stimulate brain regions with millimetric and sub-millimetric precision. DBS electrodes may be used for stimulation as a way of treating conditions such as Parkinson's disease and essential tremor, and potentially some forms of epilepsy. Although DBS electrodes may be implanted through minimally invasive surgical techniques, the DBS electrodes are nonetheless configured to penetrate the brain and thus carry a risk of damage to the brain, hemorrhage, stroke, and/or seizures. Furthermore, only a limited number of DBS electrodes may be placed safely and there is limited ability to adjust the spatial placement of the electrodes after initial placement. While DBS techniques have an excellent safety profile demonstrated over two decades of standard clinical use, these electrodes are macroscopic and only a small number (typically one or two electrodes) are placed in any single patient, thus limiting their utility for neural interfaces.

Accordingly, there remains a need for high-bandwidth neural interfaces for the brain that allow for improved spatial resolution, temporal resolution, reduced collateral damage to the normal brain tissue, and optimization for electrical recording and/or electrical stimulation.

SUMMARY

Embodiments for systems and methods for high-bandwidth minimally invasive brain computer interfaces (BCIs) and a comprehensive interventional electrophysiology suite are disclosed. In some embodiments, the comprehensive interventional electrophysiology suite may be inspired by techniques in cardiac electrophysiology. Among the innovations described herein are systems and methods for deploying high-spatial-resolution ECoG arrays in a minimally invasive manner.

Embodiments of the present disclosure include a minimally invasive method for precisely diagnosing and treating epilepsy, including advancing a catheter or cannula having an electrode array through the subdural space, a ventricle, or a blood vessel to a target area of the brain, and deploying the electrode array configured for at least one of stimulating or recording from the target area of the brain. In one embodiment the target area resides within the temporal lobe.

Embodiments of the present disclosure include a minimally invasive method for treating vision loss including advancing a catheter or cannula having an electrode array through the subdural space, a ventricle, or a blood vessel (such as the superior sagittal sinus, the transverse sinus, or the straight sinus) to a target area of the brain, and deploying the electrode array configured for at least one of stimulating or recording from the target area of the brain. In some embodiments, the target area is the visual cortex.

Embodiments disclosed herein include a system for minimally invasively interfacing with a nervous system of a patient. The system comprises: one or more electrode arrays configured to be minimally invasively inserted to a target area of the nervous system; an imaging module configured to provide real-time information related to a location of the one or more electrode arrays; an electrophysiologic guidance module configured to detect a position of the one or more electrode arrays; one or more processors; and a non-transitory, computer-readable medium storing instructions that, when executed, cause the one or more processors to: receive the real-time information related to the location of the one or more electrode arrays from the imaging module, receive the detected position of the one or more electrode arrays from the electrophysiologic guidance module, acquire one or more signals from the one or more electrode arrays related to one or more electrical measurements at the target area of the nervous system, and decode the one or more acquired signals to obtain the one or more electrical measurements.

According to some embodiments, the system further comprises a data telemetry module configured to record the one or more signals from the one or more electrode arrays. According to additional embodiments, the instructions, when executed, cause the one or more processors to acquire the one or more signals from the one or more electrode arrays via the data telemetry module.

According to some embodiments, the one or more electrode arrays are further configured to stimulate the target area, wherein the instructions, when executed, further cause the one or more processors to selectively activate the one or more electrode arrays to stimulate the target area.

According to some embodiments, the one or more electrode arrays are further configured to be minimally invasively inserted to the target area by one or more of: a percutaneous insertion, a cortical insertion, a subdural insertion, and an endovascular insertion.

According to some embodiments, the system further comprises a delivery catheter configured to deploy the one or more electrode arrays to the target area, wherein the one or more electrode arrays comprise stent-based electrode arrays. According to additional embodiments, the delivery catheter is further configured to re-sheath and retract the one or more electrode arrays.

According to some embodiments, the imaging module comprises a fluoroscopy module, a computed tomography (CT) module, an angiography module, and a stereotactic guidance module.

According to some embodiments, the target area is selected from the group consisting of a temporal lobe, an occipital lobe, a parietal lobe, a lateral geniculate nucleus, a visual cortex, a hypothalamic ventricular area, and a hippocampus.

According to some embodiments, the one or more electrode arrays are configured to be minimally invasively inserted through at least one of a ventricle, a subdural space, a brain vasculature, and a blood vessel to the target area.

Embodiments disclosed herein also include a method for minimally invasively treating epilepsy in a patient. The method comprises: inserting a delivery catheter through an entry slit formed on the patient, wherein the catheter houses one or more electrode arrays; advancing the delivery catheter through at least a subdural space to a location proximate a temporal lobe of a brain of the patient; deploying, from the delivery catheter, the one or more electrode arrays to the location proximate the temporal lobe, wherein the one or more electrode arrays are positioned and configured to perform at least one of stimulating the temporal lobe and recording electrical measurements from the temporal lobe; and retracting the delivery catheter out of the entry slit.

According to some embodiments, the method further comprises monitoring real-time information related to a location of the delivery catheter from an imaging module during advancement of the delivery catheter to the location proximate the temporal lobe. According to additional embodiments, the imaging module comprises a fluoroscopy module, a computed tomography (CT) module, an angiography module, and a stereotactic guidance module. According to additional embodiments, the method further comprises confirming a position of the one or more electrode arrays at the location proximate the temporal lobe by an electrophysiologic guidance module.

According to some embodiments, the one or more electrode arrays comprise stent-based electrode arrays. According to some embodiments, the method further comprises re-sheathing the one or more electrode arrays into the delivery catheter prior to retracting the delivery catheter.

Embodiments disclosed herein also include a method for minimally invasively treating impaired vision in a patient. The method comprises: inserting a delivery catheter through an entry slit formed on the patient, wherein the catheter houses one or more electrode arrays; advancing the delivery catheter through at least a subdural space to a location proximate a visual cortex of a brain of the patient; deploying, from the delivery catheter, the one or more electrode arrays to the location proximate the visual cortex, wherein the one or more electrode arrays are positioned and configured to perform at least one of stimulating the visual cortex and recording electrical measurements from the visual cortex; and retracting the delivery catheter out of the entry slit.

According to some embodiment, the impaired vision is related to macular degeneration in the patient.

According to some embodiments, the method further comprises monitoring real-time information related to a location of the delivery catheter from an imaging module during advancement of the delivery catheter to the location proximate the visual cortex. According to additional embodiments, the imaging module comprises a fluoroscopy module, a computed tomography (CT) module, an angiography module, and a stereotactic guidance module. According to additional embodiments, the method further comprises confirming a position of the one or more electrode arrays at the location proximate the visual cortex by an electrophysiologic guidance module.

According to some embodiments, the one or more electrode arrays comprise stent-based electrode arrays. According to additional embodiments, the method further comprises re-sheathing the one or more electrode arrays into the delivery catheter prior to retracting the delivery catheter.

Embodiments disclosed herein also include a method for minimally invasively treating impairment of movement in a patient. The method comprises: inserting a delivery catheter through an entry slit formed on the patient, wherein the catheter houses one or more electrode arrays; advancing the delivery catheter through at least a subdural space to a location proximate a target area in a brain of the patient; deploying, from the delivery catheter, the one or more electrode arrays to the location proximate the target area, wherein the one or more electrode arrays are positioned and configured to perform at least one of stimulating the target area and recording electrical measurements from the target area; and retracting the delivery catheter out of the entry slit.

According to some embodiments, the impairment of movement is caused by a condition selected from the group consisting of: Parkinson's disease, Huntington's disease, essential tremor, ataxia, dystonia, an impulse control disorder, paralysis, stroke, spinal cord injury, and spinal cord degeneration.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. Various aspects of at least one example are discussed below with reference to the accompanying drawings, which are not intended to be drawn to scale. In the drawings.

DETAILED DESCRIPTION

As discussed herein, it would be advantageous to have high-bandwidth, minimally invasive neural interfaces for the brain. Ideally, the neural interfaces would provide improved spatial resolution, temporal resolution, reduced collateral damage to the normal brain tissue, and optimization for electrical recording and/or electrical stimulation. In some embodiments, the neural interfaces may be used to treat epilepsy, blindness, paralysis, stroke, impulse control disorders, and other conditions relating to the electrophysiology of the brain.

Accordingly, the present disclosure describes a system for minimally invasively interfacing with a nervous system of a patient. The system comprises one or more electrode arrays configured to be minimally invasively inserted to a target area of the nervous system, an imaging module configured to provide real-time information related to a location of the electrode arrays, an electrophysiologic guidance module configured to detect a position of the electrode arrays, and one or more processors configured receive the real-time information from the imaging module and the detected position of the electrode arrays from the electrophysiologic guidance module to confirm placement of the electrode arrays. The processor may also be configured to acquire one or more signals from the electrode arrays related to one or more electrical measurements at the target area of the nervous system, and decode the acquired signals to obtain the one or more electrical measurements. The system may be used, for example, to treat epilepsy, vision loss, and/or other conditions related to the nervous system.

High-Bandwidth Minimally Invasive Brain-Computer Interfaces

Disclosed herein are systems and methods for high-bandwidth minimally invasive brain computer interfaces (BCIs). Embodiments include a comprehensive interventional electrophysiology suite.

Disclosed herein are embodiments of neural interfaces configured for use in brain computer interfaces (BCIs) that include applications for various conditions such as epilepsy, blindness, paralysis, functional restoration and rehabilitation after stroke, treatment of obesity and impulse control disorders, and the like. Additionally, the embodiments described herein may be used for enhanced or augmented reality.

Conventional brain-computer interfaces take one of two approaches: (1) non-invasive approach or (2) invasive approach. The non-invasive approach, which may rely upon electroencephalography (EEG), while safe and scalable, has many disadvantages including poor signal quality, and inferior empirical performance. For example, the spatial and temporal resolution of non-invasive BCIs is far inferior to surgical alternatives due to the distance and shielding of target areas in the brain from the electrodes of the device.

Invasive approaches (as exemplified e.g. by the BrainGate system) require high-risk, invasive surgeries that surgically implant electrodes onto the brain surface or deep in the brain itself. While these provide strong signal quality, and precision, they come with many disadvantages. Invasive surgery involves trauma to healthy brain tissue and carries a substantial risk of infection. Additionally, the invasive surgeries and subsequent monitoring require expensive, resource intensive techniques that are not scalable. Many invasive electrophysiology approaches also require patients to remain physically connected to cables and wires that connect electrodes in the brain directly to external hardware and are mechanically tethered to the head of the patient. Thus, the practical benefits to patients remain limited, and patients are reluctant to have elective invasive procedures.

Embodiments of the present disclosure provide brain-computer interfaces that adopt a minimally invasive approach. The disclosed brain-computer interfaces allow for the implantation of electrode arrays that provide high data bandwidth and high spatiotemporal resolution. Electrode arrays may be delivered and used for cortical mapping in a minimally invasive manner. Three primary minimally invasive delivery methods are considered: (1) cortical surface delivery, (2) ventricular delivery, and (3) endovascular delivery. The minimally invasive delivery methods are designed to deliver conformable neural interfaces through the fluid-filled spaces of the brain rather than through brain tissue, thus minimizing procedural damage to healthy brain. Additionally, the minimally invasive delivery methods discussed herein may be configured to achieve the high resolution and precision that non-invasive approaches are unable to obtain. Yet at the same time, the minimally invasive delivery methods are capable of being cheaper, faster, and safer than traditional invasive open brain surgery.

Ventricular delivery and endovascular delivery techniques in the nervous system may draw inspiration from cardio electrophysiology techniques. For example, minimally invasive approaches have been well established in the cardiac electrophysiology field, which employs endovascular electrode arrays as well as percutaneous electrophysiology techniques, all in the setting of an interventional radiology suite or catheter laboratory (as opposed to a surgical operating room). The disclosed percutaneous, stereotactic, endoscopic, endovascular, and other delivery techniques may be used to deploy neural interfaces including electrode arrays with hundreds and thousands of small electrodes directly in the brain into the subdural space, the ventricles, through its blood vessels, or otherwise.

Figure 1:
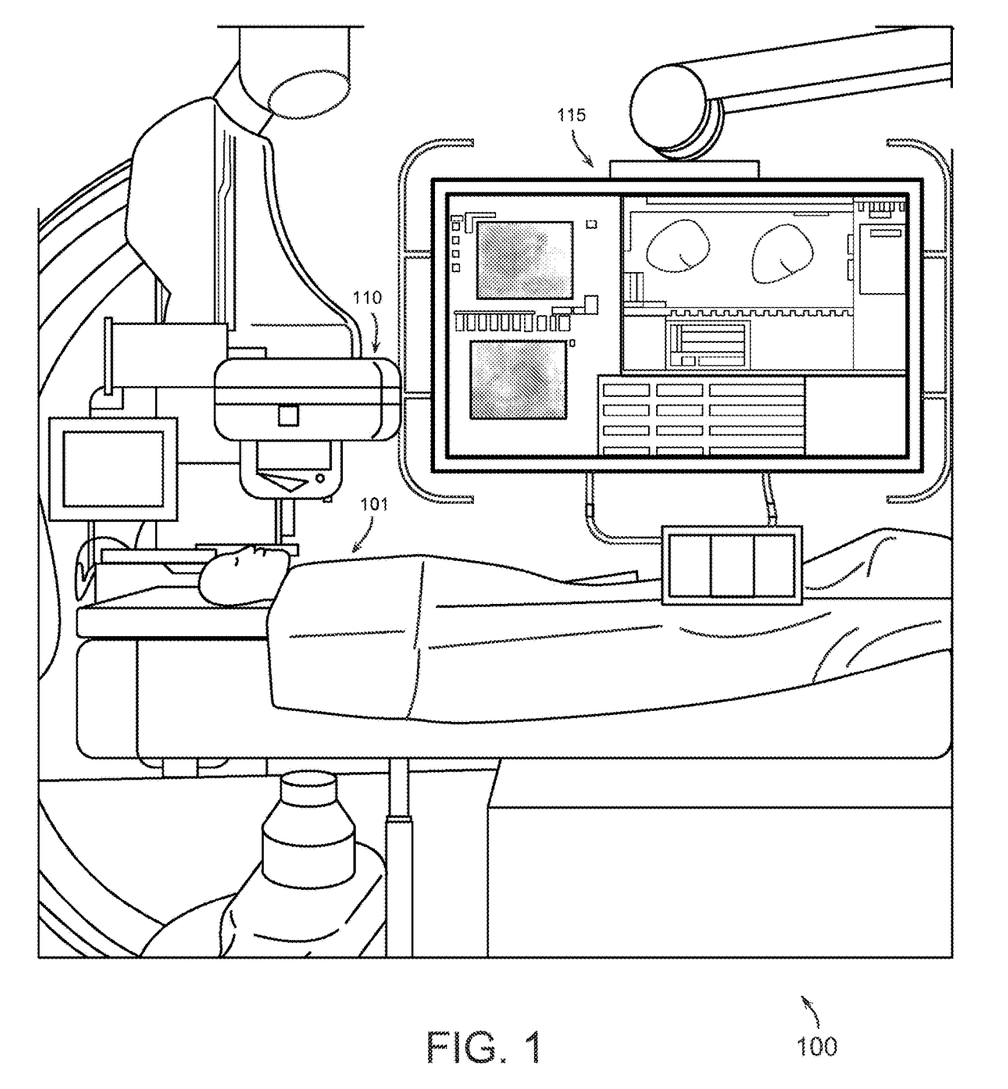
FIG. 1 depicts a comprehensive interventional neuro-electrophysiology suite in accordance with an embodiment.

FIG. 1 illustrates a comprehensive interventional neuro-electrophysiology suite 100 built in accordance with the systems and methods described herein. The concept of an interventional neuro-electrophysiology suite has precedent in cardiac electrophysiology, but a comprehensive procedural suite of this nature has no precedent in neuro-electrophysiology. A comprehensive neuro-electrophysiology suite 100 may include one or more of minimally invasive electrode interfaces (not shown), the electronic hardware required to perform real-time signal acquisition, processing and neural decoding (among other functions), storage, and neural stimulation, wired or wireless data telemetry, and real-time imaging (including fluoroscopy, computed tomography, angiography, and other modalities, including those required for stereotactic device placement).

For example, an imaging and electrophysiologic procedural suite may include a minimally invasive electrode interface (not shown) positioned in the nervous system of a patient 101, a processor (not shown) configured to acquire signals from the electrode interface and decode the acquired signals, a memory module (not shown), a data telemetry module (not shown), a real-time imaging module 110, and an electrophysiologic guidance module 115. The real-time imaging module 110 may be configured to capture real-time visual images of the nervous system of the patient to guide placement of the electrode interface. The electrophysiologic guidance module 115 may include a display configured to display one or more electrophysiologic measurements that confirm placement of the electrode interface, e.g., based on measurements collected from the electrode interface and/or another probe. For example, electrophysiological information that identifies electrical activity can be presented as an image that enables determination of an anatomical location. As shown, in some embodiments, a common display may be used for both the electrophysiologic guidance module and for displaying images from the real-time imaging module. In some embodiments, the processor and related components may include architectures configured for accelerating the underlying computational processes such as graphical processing units (GPUs), tensor processing units (TPUs) and the like. Components of the imaging and electrophysiologic procedural suite may be configured for interacting with high-bandwidth electrode arrays and include improved systems and methods for real-time imaging, signal processing, and neural decoding.

In cardiac electrophysiology pacemaker electrodes enter the heart through its blood vessels and interact with the heart through a unit implanted in the chest wall that includes computing, data storage, wireless telemetry, software upgrades and power. Like implantable pacemakers which are used to regulate the heart, the disclosed systems may be used in connection with devices configured to regulate the brain (e.g., deep brain stimulator for Parkinson's disease or other brain-machine interface or brain-computer interface configuration). Similar to the percutaneous and intravascular electrical interfaces for mapping and stimulating the heart, the disclosed systems and methods may be used for mapping and stimulating the brain. Additionally, similar to the use of four-dimensional cardiac electrophysiologic mapping to diagnose, localize, and treat cardiac arrhythmias such as atrial fibrillation, an electrical disorder of the heart, the disclosed systems may be used to localize, diagnose, and treat electrical disorders of the brain, such as epileptic seizures.

Figure 2:
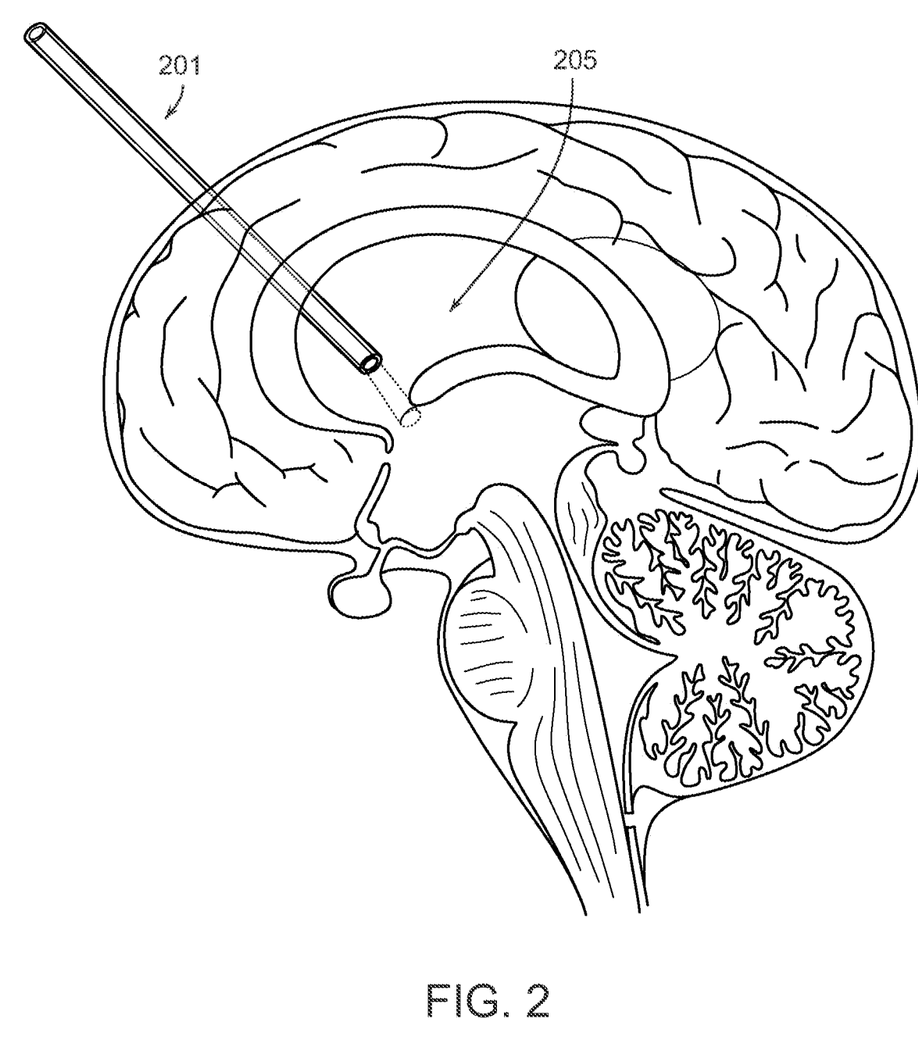
FIG. 2 depicts a method for ventricular delivery in accordance with an embodiment.

FIG. 2 illustrates a method for ventricular delivery in accordance with some embodiments of the present disclosure. Ventricular delivery of a neural device may include navigating a device such as an endoscope 201 into a ventricle 205, or cavity in the brain filled with spinal fluid. Once in the ventricle, the device can reach deep brain structures. The ventricular delivery of a neural device may only require a small burr hole or slit, which minimizes trauma and operative time.

Figure 3A:
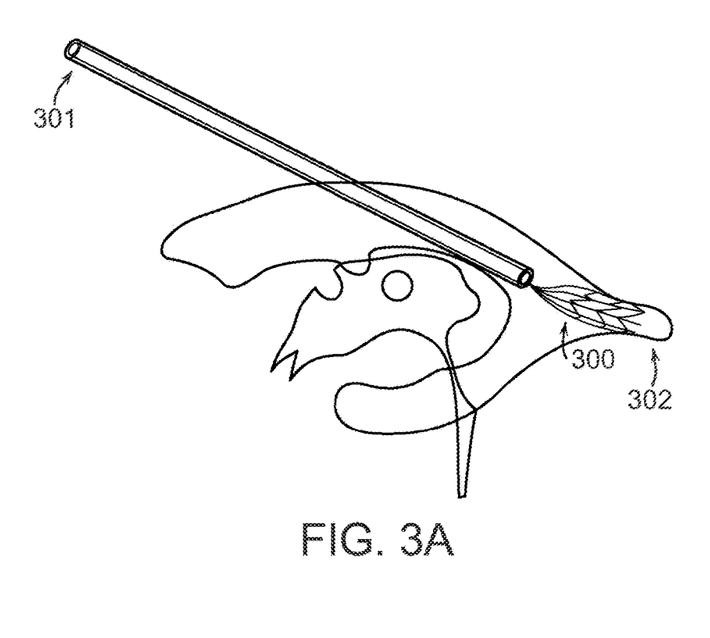
FIG. 3A depicts a first view of an endoscopic deployment of an electrode array within the ventricular system in accordance with an embodiment.
Figure 3B:
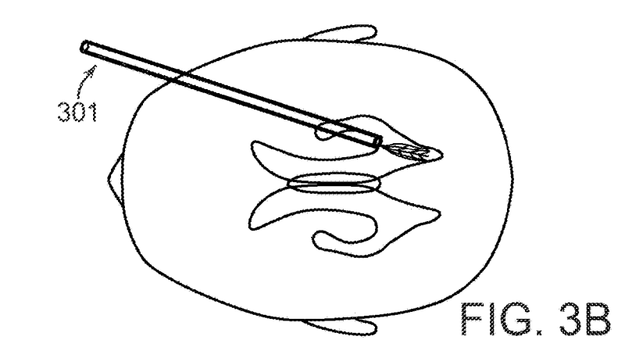
FIG. 3B depicts a second view of an endoscopic deployment of an electrode array within the ventricular system in accordance with an embodiment.
Figure 3C:
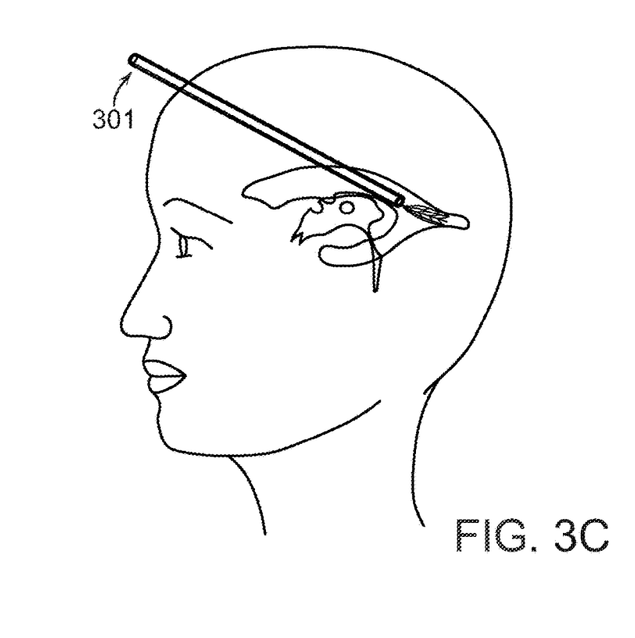
FIG. 3C depicts a third view of an endoscopic deployment of an electrode array within the ventricular system in accordance with an embodiment.

FIGS. 3A-C illustrate endoscopic deployment of an electrode array within the ventricular system according to the systems and methods described herein. FIGS. 3A-3C illustrate endoscopic insertion of a conformal electrode array 300 into the occipital horn 302 of the right lateral ventricle in a human patient. An endoscope 301 is used to gain access to the temporal horn in minimally invasive fashion. The trajectory of the endoscope is shown in sagittal views in FIGS. 3A and 3C (from the left), and in an axial view in FIG. 3B (from above). The conformal electrode array 300 may assume a narrow axial configuration when confined to the inner channel of the endoscope, and then expand when unsheathed from the endoscope in the occipital horn of the lateral ventricle. Once expanded, the conformal electrode array 300 may be configured to stimulate the optic radiations as they converge toward the visual cortex in the occipital lobe of the brain.

Figure 4:
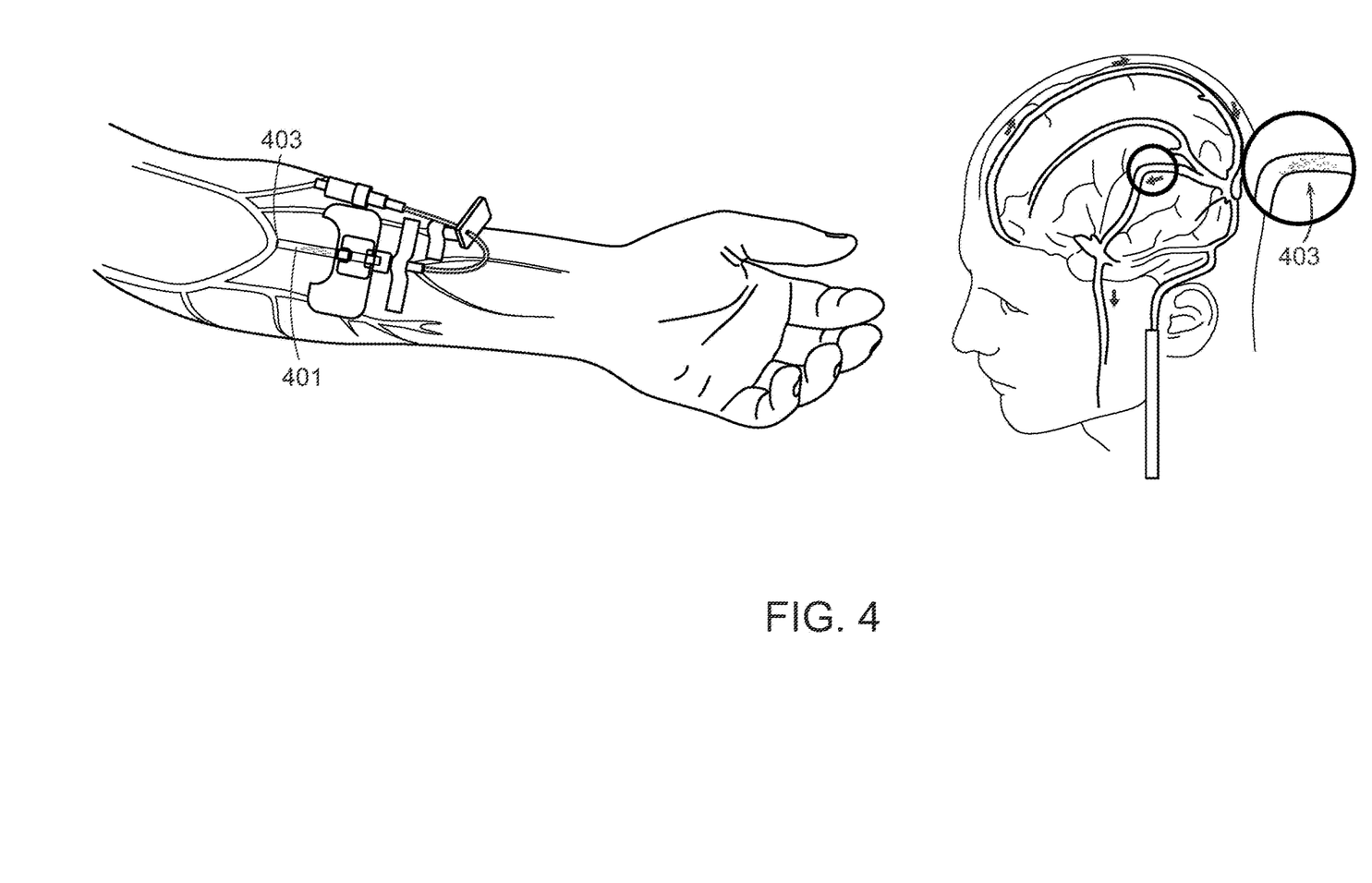
FIG. 4 depicts a method for endovascular delivery in accordance with an embodiment.

FIG. 4 illustrates a method for endovascular delivery in accordance with some embodiments of the present disclosure. Endovascular delivery approaches may be performed in a catheter lab. Various structures in the brain including deep brain structures can be accessed through an entry point in a vein or an artery in an upper or lower limb, or elsewhere in the body. The endovascular delivery approach does not require an incision of the skull. Additionally, endovascular techniques allow for the movement of electrodes through the brain in real time, an advantage over conventional systems. As illustrated, a catheter 401 may be advanced through a vein 403 to enter the brain. Once in the target region, the catheter may deploy an electrode array 405. For example, as illustrated in FIG. 4, the electrode array may be deployed in connection with a stent located in the intracranial veins adjacent to the temporal lobe.

Minimally invasive neural interfaces may utilize retrievable stents. In some embodiments, retrievable stents may include 10 mm polymer (PEEK) stents including insulating substrates on electrodes. In some embodiments, the retrievable stents may include 5 mm nitinol stents with individually soldered electrodes. In some embodiments, the retrievable stents may include Nitinol stents covered with polymer-electrode composited arrays. A minimally invasive delivery method may include the following steps: (1) inserting a catheter through a vein the in the arm or leg of a patient, (2) navigating the catheter to a large vein in the brain (e.g., transverse sinus), (3) deploying a stent-based electrode array via the catheter, (4) real-time image-guidance and registration for all steps, (5) electrophysiologic confirmation. The deployed stent-based electrode arrays may be capable of one or more of recording and stimulating.

Figure 5:
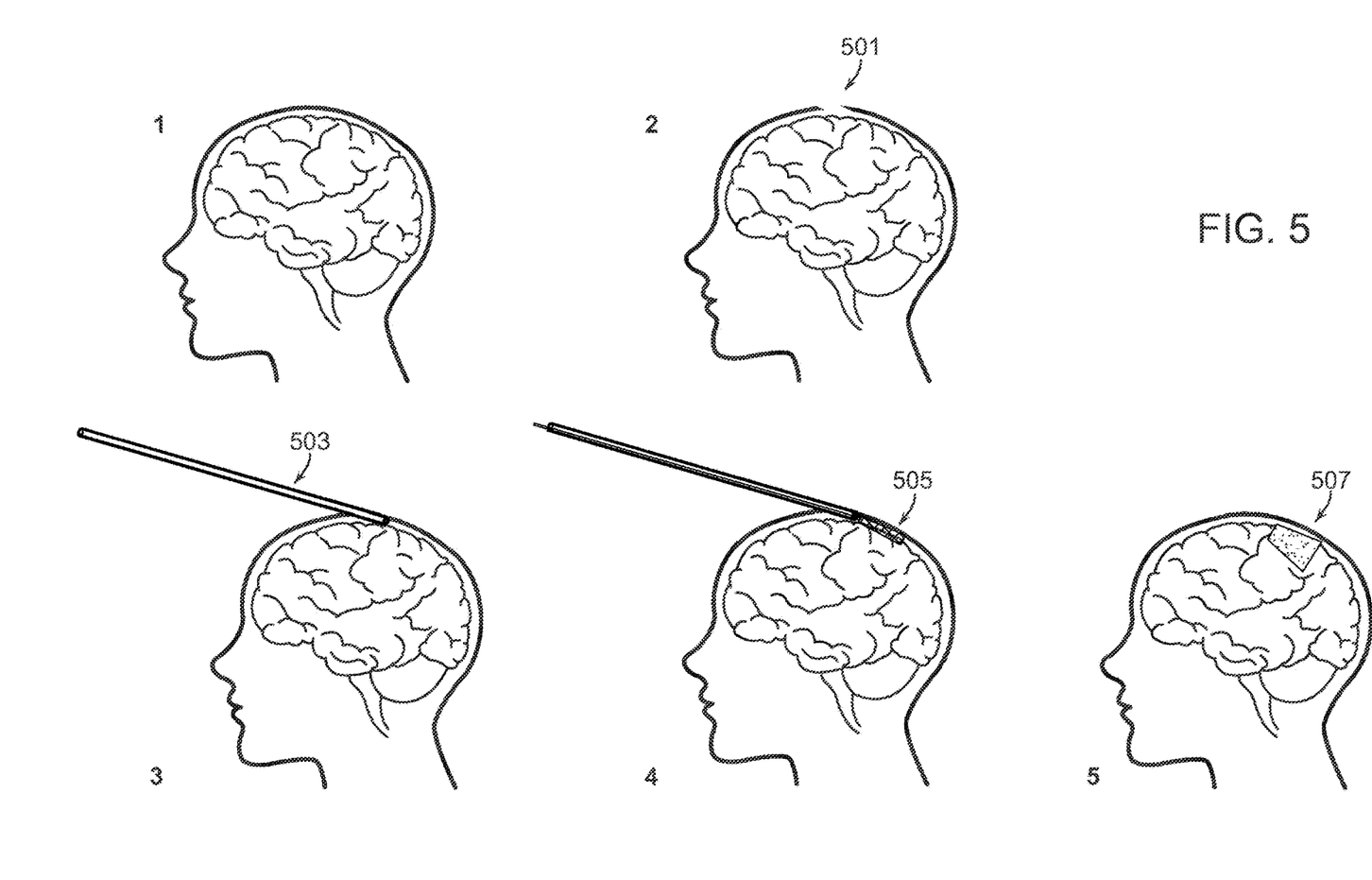
FIG. 5 depicts a method for delivery into the subdural space in accordance with an embodiment.

FIG. 5 provides an additional schematic for a method for delivery of an electrode array for a neural interface within the subdural space in accordance with some embodiments of the present disclosure. Panel 1 depicts a simplified view of a head and brain of a patient prior to performing the method. As shown in Panel 2, a first step of the method may comprise drilling 501 a small burr hole or slit through the skull of the patient. As shown in Panel 3, a catheter delivery device may be inserted 503 through the burr hole or slit and into the subdural space. As shown in Panel 4, an expandable electrode array may be advanced 505 through the delivery catheter or cannula to a target site. As shown in Panel 5, the electrode array may be deployed 507 to a deployed configuration within a target area of the brain, and the catheter delivery device may be retracted.

Figure 6:
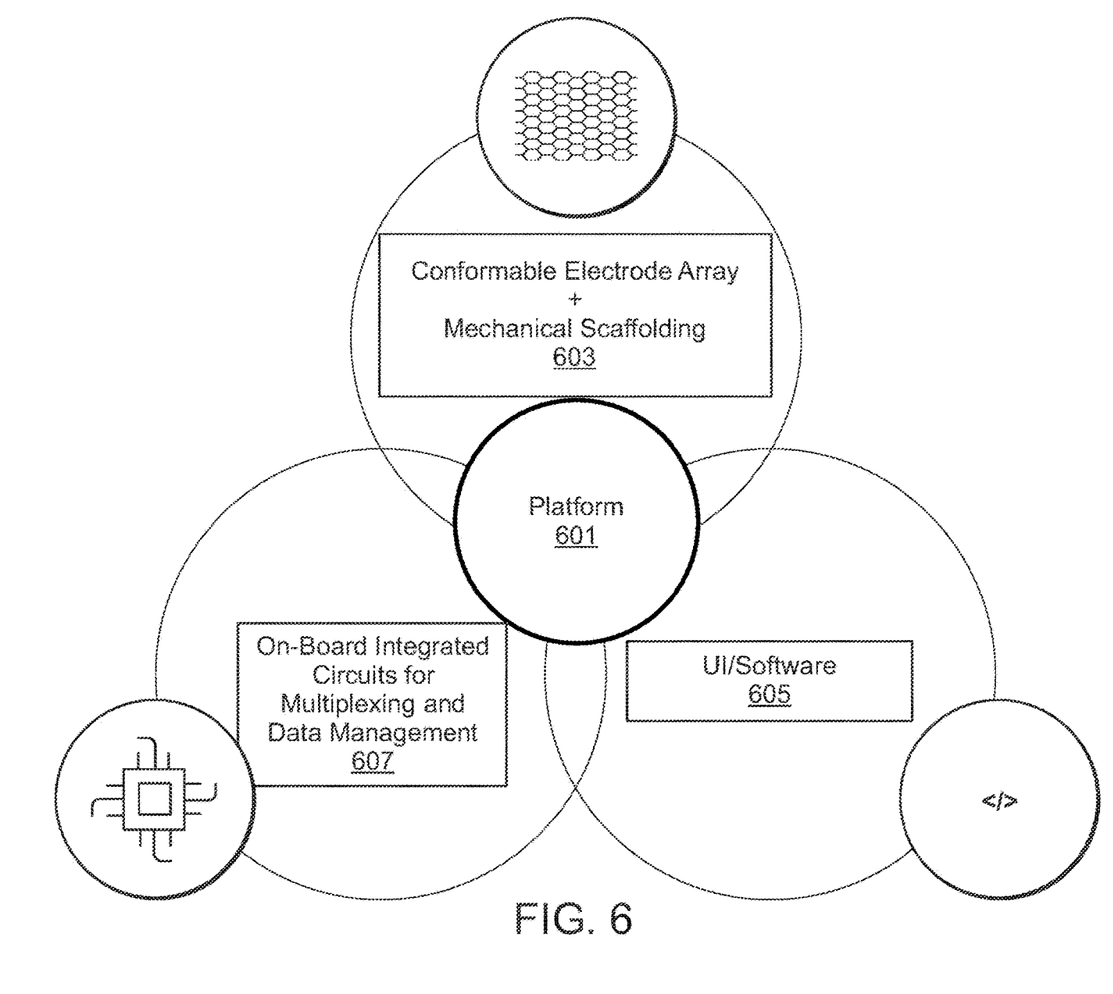
FIG. 6 illustrates a platform for brain computer interfaces in accordance with an embodiment.

As illustrated in FIG. 6, the disclosed minimally invasive techniques may form a broader platform 601 including conformable electrode arrays built on a variety of mechanical scaffolds with electrodes 603 that are implantable, on-array integrated circuits for signal multiplexing and data management 607, and advanced user interface and software 605. Example applications for said platform 601 include epilepsy, vision, paralysis, assessment and rehabilitation and restoration of function following stroke, obesity, sleep and memory and cognitive function, gaming and augmented and virtual reality, and the like. For example, applications for epilepsy may include percutaneous and subdural and ventricular and endovascular arrays. In another example, applications for vision may target the visual cortex. In another example, applications for obesity may involve hypothalamic ventricular areas. And in yet another example, applications for sleep and memory may involve a hippocampal array interface.

Embodiments of the disclosed interventional suite for minimally invasive neural interfaces may include electrode arrays such as stent 403 with many hundreds or thousands of small electrodes configured to be deployed into the brain through its blood vessels, together with the imaging apparatus and electronics and software required to deploy and operate the high-bandwidth array. Analogous to techniques utilized in cardiac electrophysiology devices the disclosed systems and methods may allow for percutaneous, cortical surface, endoscopic, intraventricular, or intravascular electrical interfaces for mapping and stimulating the nervous system.

The disclosed minimally invasive neural interfaces may be used to compile large data sets of neural activity including data obtained at higher resolution (both spatially and temporally). Embodiments of the present disclosure may include software packages capable of remote, wireless or wired upgrades. Accordingly, functionality of the neural interface may be improved over time. Disclosed systems can include software interfaces such as software 405 that are configured for continuous upgrades. Similar to the manner in which cochlear implants for children are implanted during infancy but receive continuous software upgrades into adulthood without additional surgery, the disclosed BCIs may be configured to receive continuous software upgrades over time, thus improving the operation of the neural interface. Systems and methods of implantation of such systems in the context of a procedural suite designed for real-time imaging and electrophysiology are described herein.

The disclosed minimally invasive neural interfaces may form a portion of a comprehensive interventional electrophysiology system for the brain and may be coupled with one or more of the following: electrode catheters, electrode stents, electrode guide-wires; electrical recording hardware; mapping software; imaging infrastructure in a catheter-laboratory-type setting.

Although the present disclosure has been described in considerable detail with reference to certain preferred embodiments thereof, other versions are possible. Therefore, the spirit and scope of the appended claims should not be limited to the description and the preferred versions contained within this specification. Various aspects of the present disclosure will be illustrated with reference to the following non-limiting examples:

Exemplary Applications of the Neural Interface Embodiments Herein

Example 1: Vision

In some embodiments, the disclosed minimally invasive neural interface may be used to restore and/or augment vision. Electrodes may be navigated to the transverse sinus and superior sagittal sinus of the brain, or through the subdural space onto the visual cortex, in order to stimulate the visual cortex of the brain in order to stimulate and/or restore visual perception.

Conventional neural interface systems for augmenting or treating vision disorders require implantation of devices in the eye itself, incisions in the eye, or traditional "open brain" neurosurgical procedures, with placement of electrodes on the visual cortex. By contrast, the disclosed systems are capable of avoiding traditional surgery, and do not require surgical opening of the eye or a craniotomy to expose the brain. This type of "incisionless" or "minimally invasive" surgery typically appeals to patients intuitively, and when it has replaced "open" surgery for other indications has had many other benefits (lower rates of infection and shorter hospitalizations, for example, as well as less postoperative pain, better cosmetic outcomes, and no scars).

The disclosed systems may be used for treating common forms of blindness that affect the eye but do not affect the visual cortex of the brain. For example, macular degeneration, impacts approximately 3 million cases per year in the US. While conventional neural interfaces focus on stimulating the retina (although retina cells may be dying), the disclosed systems may provide direct stimulation of the brain (which ultimately receives signals from the retina). Additionally, the disclosed systems and methods would work even if the entire retina were diseased. Embodiments disclosed herein may be capable of refining the stimulation targets and patterns of stimulation. Utilizing a percutaneous, cortical-subdural, or endovascular approach, the disclosed systems may be capable of reaching all stages of the visual processing hierarchy. Systems and methods of implantation of such systems in the context of a procedural suite designed for real-time imaging and electrophysiology are described here.

The disclosed embodiments may be configured to position a conformable electrode array relative to the bloodstream and surrounding tissue outside the blood vessel, or the cortical surface from the subdural space, or brain structure adjacent to the ventricular system. Stimulating the visual cortex (via the cortical surface from the subdural space, or via the transverse sinus and/or superior sagittal sinus) with the disclosed neural interface could meaning-fully restore or augment vision. While conventional systems utilize direct retinal or cortical stimulation, one embodiment of the disclosed system may be capable of stimulating the visual cortex through the large venous sinuses (straight sinus, superior sagittal sinus, transverse sinus). Anatomically, these large venous sinuses are directly apposed to the visual cortex, and so provide access to the visual cortex.

Figure 7A:
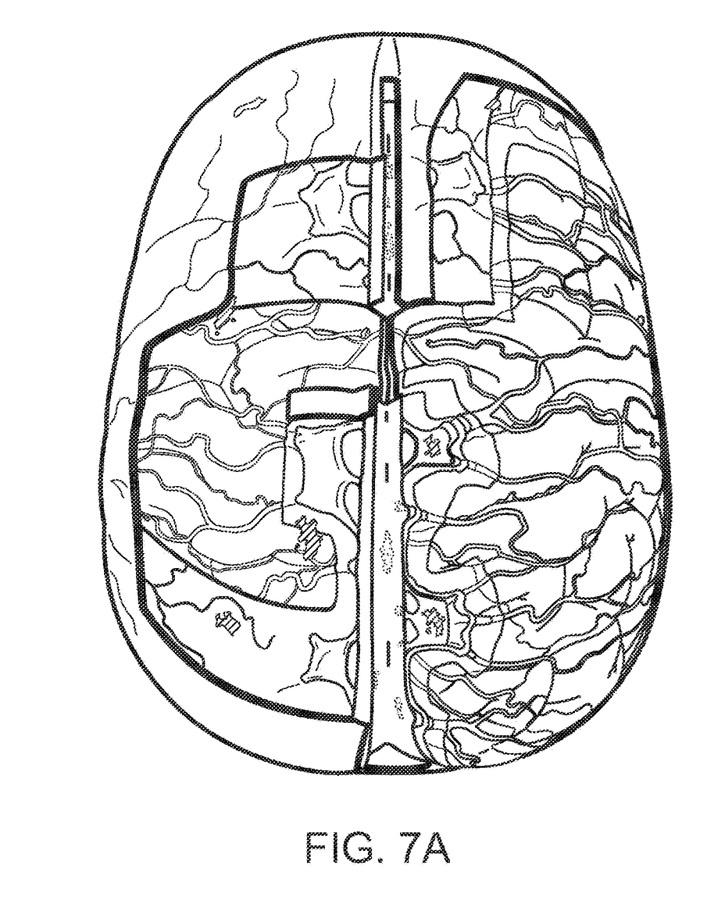
FIG. 7A illustrates a first view of visual cortex areas that may be targeted by a brain computer interface in accordance with an embodiment.
Figure 7B:
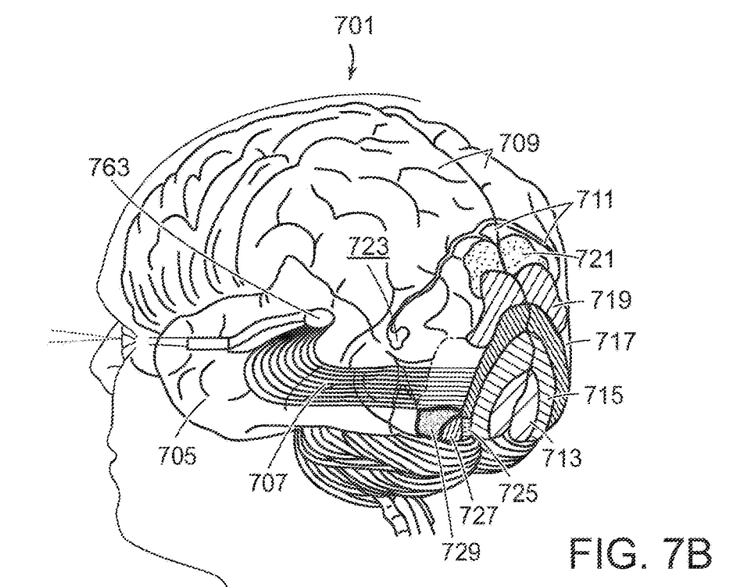
FIG. 7B illustrates a second view of visual cortex areas that may be targeted by a brain computer interface in accordance with an embodiment.
Figure 7C:
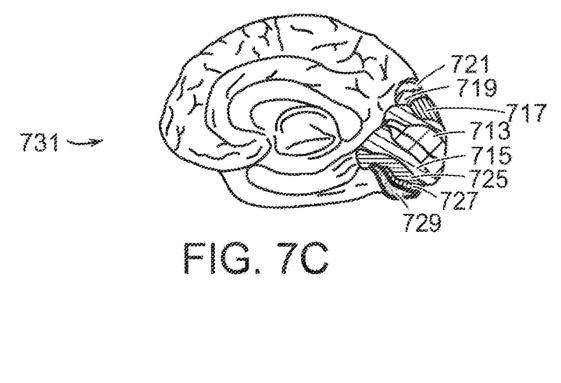
FIG. 7C illustrates a third view of visual cortex areas that may be targeted by a brain computer interface in accordance with an embodiment.

FIGS. 7A-7C illustrate areas of the visual cortex a high-bandwidth minimally invasive brain computer interface may operate within in accordance with some embodiments of the present disclosure. FIG. 7A illustrates a superior view of the brain with areas of the visual cortex indicated. FIG. 7B illustrates the visual cortices of the brain 701. In a first view, the anatomical features of the brain are illustrated including the temporal lobe 705, occipital lobe 711, parietal lobe 709, and lateral geniculate nucleus (LGN) 703. As illustrated the visual cortex includes areas such as the primary visual cortex (V1) 713, secondary visual cortex (V2) 715, third visual cortex (V3) involved with form 717, V3a involved with motion 719, V7 721, the middle temporal visual area (V5) involved with motion 723, the ventral posterior area (VP) involved in relaying signals 725, visual area V4 involved in color and form 727, and visual area 8 (V8) 729. FIG. 7C illustrates a sagittal cross-sectional view 731 of the visual cortex of the brain.

FIGS. 7A-7C illustrate areas of the visual cortex including the large venous sinuses of the brain that are directly apposed to the visual cortex. Accordingly, the disclosed high-bandwidth minimally invasive brain computer interfaces may access the visual cortex via the large venous sinuses. For example, the leaflets of the superior sagittal sinus contact the visual cortex, as is illustrated in FIGS. 7B and 7C.

In some embodiments, an endovascular electrode array may be positioned within a few tens of microns of the visual cortex. In some embodiments, an endovascular electrode array may be configured to expand (in a calibrated manner) into the tissue of the blood vessel wall over time, and the blood vessel wall remodels around the stent struts.

In some embodiments, the disclosed endovascular electrode array may be connected by wires to a unit implanted elsewhere in the body, the chest wall for example. This unit would contain the power supply, telemetry unit for wireless communication, and extensive data processing capability, as in the cases of pacemakers and deep brain stimulators.

In other embodiments, the disclosed endovascular electrode array may be connected to a self-contained, fully implantable system with custom hardware, including an application-specific integrated circuit (ASIC). In some embodiments, all of the electronics may be contained on the electrode array itself, with no wired connection to a secondary (chest wall) implant.

In other embodiments, the electrode array may be inserted via the subdural space directly onto the cortical surface of the visual cortex. In some embodiments this may be accomplished using real-time noninvasive imaging or by real-time endoscopic visualization.

Example 2: Epilepsy

Embodiments of the present disclosure may be used to study, diagnose, and/or treat epilepsy. The disclosed embodiments may be used for minimally invasive mapping of the brain to study, diagnose, and/or treat epilepsy. For example, refractory epilepsy is a seizure disorder that resists treatment by anti-seizure medication. Conventional methods for treating refractory epilepsy involve identifying targets for surgical removal and may require a craniotomy or opening of the skull or skull burr holes or slits, and an insertion of electrodes. A patient may be required to live in a hospital setting for days to observe seizures in order to locate a seizure focus in the brain. The procedure carries significant risk of infection or hematoma during the procedure and afterwards. Further, many patients are reluctant to undergo this procedure given the perceived risk, time, and invasive nature of the procedure. Accordingly, the disclosed minimally invasive system, supported by a comprehensive imaging and electrophysiology suite, provides additional benefits over conventional methods for treating refractory epilepsy.

Systems and methods built in accordance with the present disclosure may enable recording of neural activity from surfaces of the brain as required for monitoring and treating epilepsy and other disorders. Recording may be conducted from the ventricles, with the electrode arrays being placed in the ventricles through minimally invasive techniques. This circumvents the need for a craniotomy (required by current surface mapping techniques) by deployment of the electrode arrays through tiny burr holes or slits in the skull. The minimally invasive deployment also enables mapping from surfaces in the ventricles, which is currently not possible. In addition to the minimally invasive placement, the present disclosure provides a higher resolution mapping of the neural activity to more accurately spatially locate seizure foci.

In some embodiments, the electrode arrays may be configured for recapture or retrieval. For example, for diagnostic procedures, the electrode arrays may be configured to be resheathable. For example, the electrode arrays may utilize Nitinol scaffolds with "closed-cell geometry". In some embodiments the diagnostic electrode array may be deployed 85-90% of its length from the delivery catheter so that it can be resheathed and repositioned multiple times during a diagnostic procedure. In other embodiments, the stent design may enable resheathing after full deployment by including a triangular and/or conical end to enable capture by surgical tools and guide the electrode array into the catheter and/or back into a cylindrical shape. In other embodiments, a cylindrical mesh may be designed with minimal restoring force when flattened. The restoring force generates a cylindrical shape without any external forces applied but can hold a flattened shape with minimal external force allowing for placement in regions with small vertical spacing without exerting appreciable forces on the surrounding tissue.

The devices, systems, and methods as described herein are not intended to be limited in terms of the particular embodiments described, which are intended only as illustrations of various features. Many modifications and variations to the devices, systems, and methods can be made without departing from their spirit and scope, as will be apparent to those skilled in the art.

Data Processing Systems for Implementing Embodiments Herein

Figure 8:
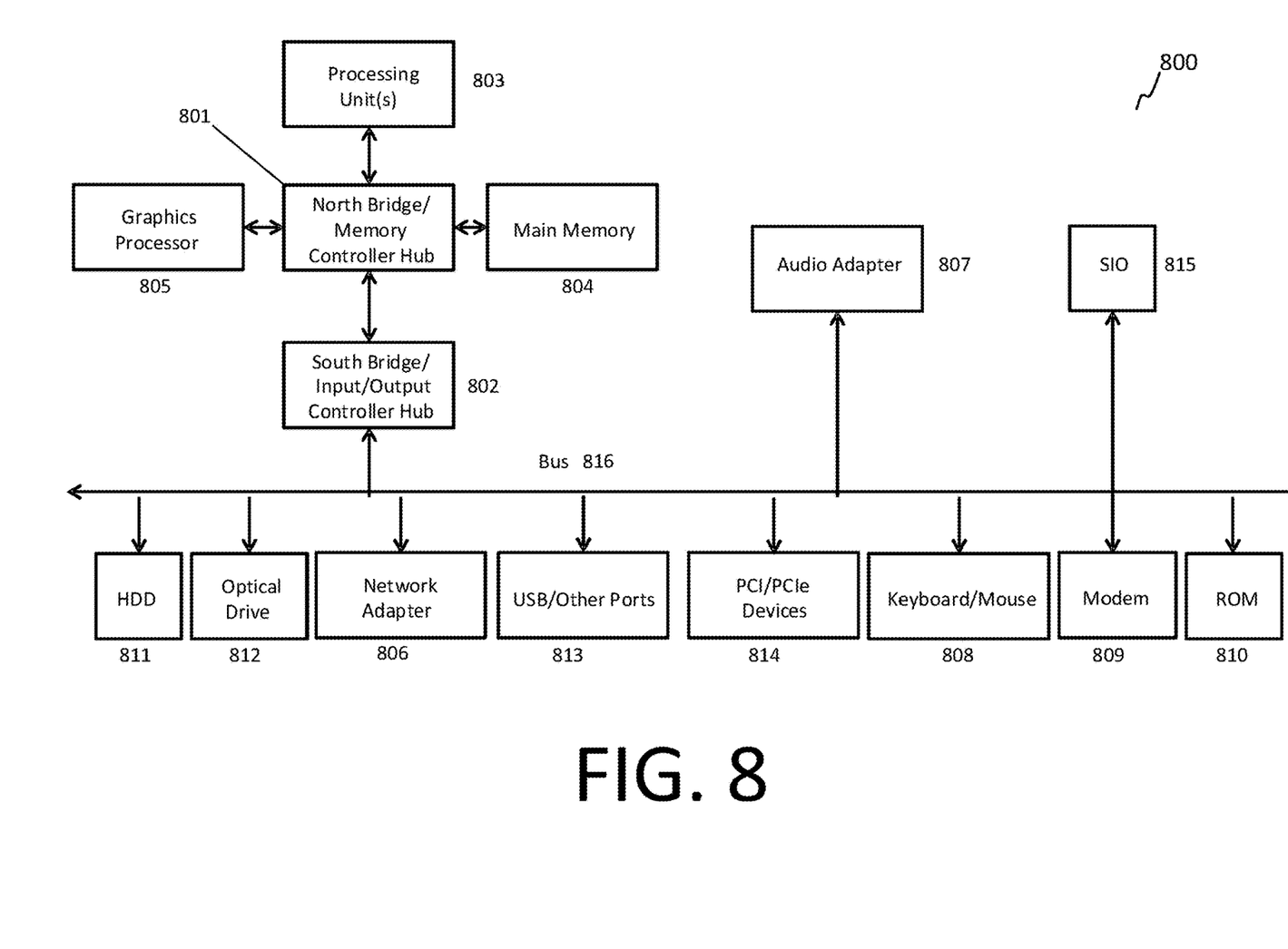
FIG. 8 depicts a block diagram of an exemplary data processing system in which embodiments of the present disclosure may be implemented.

FIG. 8 illustrates a block diagram of an exemplary data processing system 800 in which embodiments are implemented. The data processing system 800 is an example of a computer, such as a server or client, in which computer usable code or instructions implementing the process for illustrative embodiments of the present invention are located. In some embodiments, the data processing system 800 may be a server computing device. For example, data processing system 800 can be implemented in a server or another similar computing device operably connected to a brain-computer interface as described above. The data processing system 800 can be configured to, for example, transmit and receive information from the neural interface and/or cause stimulation of the brain tissue via the neural interface.

In the depicted example, data processing system 800 can employ a hub architecture including a north bridge and memory controller hub (NB/MCH) 801 and south bridge and input/output (I/O) controller hub (SB/ICH) 802. Processing unit 803, main memory 804, and graphics processor 805 can be connected to the NB/MCH 801. Graphics processor 805 can be connected to the NB/MCH 801 through, for example, an accelerated graphics port (AGP).

In the depicted example, a network adapter 806 connects to the SB/ICH 802. An audio adapter 807, keyboard and mouse adapter 808, modem 809, read only memory (ROM) 810, hard disk drive (HDD) 811, optical drive (e.g., CD or DVD) 812, universal serial bus (USB) ports and other communication ports 813, and PCI/PCIe devices 814 may connect to the SB/ICH 802 through bus system 816. PCI/PCIe devices 814 may include Ethernet adapters, add-in cards, and PC cards for notebook computers. ROM 810 may be, for example, a flash basic input/output system (BIOS). The HDD 811 and optical drive 812 can use an integrated drive electronics (IDE) or serial advanced technology attachment (SATA) interface. A super I/O (SIO) device 815 can be connected to the SB/ICH 802.

An operating system can run on the processing unit 803. The operating system can coordinate and provide control of various components within the data processing system 800. As a client, the operating system can be a commercially available operating system. An object-oriented programming system, such as the Java™ programming system, may run in conjunction with the operating system and provide calls to the operating system from the object-oriented programs or applications executing on the data processing system 800. As a server, the data processing system 800 can be an IBM® eServer™ System® running the Advanced Interactive Executive operating system or the Linux operating system. The data processing system 800 can be a symmetric multiprocessor (SMP) system that can include a plurality of processors in the processing unit 803. Alternatively, a single processor system may be employed.

Instructions for the operating system, the object-oriented programming system, and applications or programs are located on storage devices, such as the HDD 811, and are loaded into the main memory 804 for execution by the processing unit 803. The processes for embodiments described herein can be performed by the processing unit 803 using computer usable program code, which can be located in a memory such as, for example, main memory 804, ROM 810, or in one or more peripheral devices.

A bus system 816 can be comprised of one or more busses. The bus system 816 can be implemented using any type of communication fabric or architecture that can provide for a transfer of data between different components or devices attached to the fabric or architecture. A communication unit such as the modem 809 or the network adapter 806 can include one or more devices that can be used to transmit and receive data.

Those of ordinary skill in the art will appreciate that the hardware depicted in FIG. 8 may vary depending on the implementation. Other internal hardware or peripheral devices, such as flash memory, equivalent non-volatile memory, or optical disk drives may be used in addition to or in place of the hardware depicted. Moreover, the data processing system 800 can take the form of any of a number of different data processing systems, including but not limited to, client computing devices, server computing devices, tablet computers, laptop computers, telephone or other communication devices, personal digital assistants, and the like. Essentially, data processing system 800 can be any known or later developed data processing system without architectural limitation.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

As used in this document, the singular forms "a," "an," and "the" include plural references unless the context clearly dictates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells as well as the range of values greater than or equal to 1 cell and less than or equal to 3 cells. Similarly, a group having 1-5 cells refers to groups having 1, 2, 3, 4, or 5 cells, as well as the range of values greater than or equal to 1 cell and less than or equal to 5 cells, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

In addition, where features of the disclosure are described in terms of Markush groups, those skilled in the art will recognize that the disclosure is also thereby described in terms of any individual member or subgroup of members of the Markush group.

By hereby reserving the right to proviso out or exclude any individual members of any such group, including any sub-ranges or combinations of sub-ranges within the group, that can be claimed according to a range or in any similar manner, less than the full measure of this disclosure can be claimed for any reason. Further, by hereby reserving the right to proviso out or exclude any individual substituents, structures, or groups thereof, or any members of a claimed group, less than the full measure of this disclosure can be claimed for any reason.

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $\frac{1}{10}$ of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art. Where the context of the disclosure indicates otherwise, or is inconsistent with such an interpretation, the above-stated interpretation may be modified as would be readily apparent to a person skilled in the art. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). Further, the transitional term "comprising," which is synonymous with "including," "containing," or "characterized by," is inclusive or open-ended and does not exclude additional, unrecited elements or method steps. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

The terms "patient" and "subject" are interchangeable and refer to any living organism which contains neural tissue. As such, the terms "patient" and "subject" may include, but are not limited to, any non-human mammal, primate or human. A subject can be a mammal such as a primate, for example, a human. The term "subject" includes domesticated animals (e.g., cats, dogs, etc.); livestock (e.g., cattle, horses, swine, sheep, goats, etc.), and laboratory animals (e.g., mice, rabbits, rats, gerbils, guinea pigs, possums, etc.). A patient or subject may be an adult, child or infant.

The term "tissue" refers to any aggregation of similarly specialized cells which are united in the performance of a particular function.

The term "disorder" is used in this disclosure to mean, and is used interchangeably with, the terms "disease," "condition," or "illness," unless otherwise indicated.

The term "real-time" is used to refer to calculations or operations performed on-the-fly as events occur or input is received by the operable system. However, the use of the term "real-time" is not intended to preclude operations that cause some latency between input and response, so long as the latency is an unintended consequence induced by the performance characteristics of the machine.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

Throughout this disclosure, various patents, patent applications and publications are referenced. The disclosures of these patents, patent applications and publications are incorporated into this disclosure by reference in their entireties in order to more fully describe the state of the art as known to those skilled therein as of the date of this disclosure. This disclosure will govern in the instance that there is any inconsistency between the patents, patent applications and publications cited and this disclosure.

What is claimed is:

1. A method for minimally invasively treating epilepsy in a patient, the method comprising:
   inserting one or more electrode arrays through an entry slit formed on the patient, wherein the one or more electrode arrays comprise stent-based electrode arrays;
   advancing the one or more electrode arrays through at least a subdural space along a cortical surface to a location proximate a temporal lobe of a brain of the patient;
   receiving, via the one or more electrode arrays, electrical signals of the brain;
   decoding the electrical signals to acquire electrical measurements of neural activity of the brain;
   determining an anatomical location of the one or more electrode arrays on the brain based on the electrical measurements of neural activity;
   displaying, via a display, an image comprising electrophysiological information corresponding to the anatomical location of the one or more electrode arrays; and
   deploying the one or more electrode arrays to the location proximate the temporal lobe, wherein the one or more electrode arrays are positioned and configured to perform at least one of stimulating the temporal lobe and recording electrical measurements from the temporal lobe.

2. The method of claim 1, further comprising monitoring real-time information related to a location of the one or more electrode arrays from an imaging modality during advancement of the one or more electrode arrays to the location proximate the temporal lobe.

3. The method of claim 2, wherein the imaging modality comprises at least one of fluoroscopy, computed tomography (CT), and angiography.

4. The method of claim 2, further comprising confirming a position of the one or more electrode arrays at the location proximate the temporal lobe by the image of the electrophysiological information.

5. A method for minimally invasively treating impaired vision in a patient, the method comprising:
   inserting one or more electrode arrays through an entry slit formed on the patient, wherein the one or more electrode arrays comprise stent-based electrode arrays;
   advancing the one or more electrode arrays through at least a subdural space along a cortical surface to a location proximate a visual cortex of a brain of the patient;
   receiving, via the one or more electrode arrays, electrical signals of the brain;
   decoding the electrical signals to acquire electrical measurements of neural activity of the brain;
   determining an anatomical location of the one or more electrode arrays on the brain based on the electrical measurements of neural activity;
   displaying, via a display, an image comprising electrophysiological information corresponding to the anatomical location of the one or more electrode arrays; and
   deploying the one or more electrode arrays to the location proximate the visual cortex, wherein the one or more electrode arrays are positioned and configured to perform at least one of stimulating the visual cortex and recording electrical measurements from the visual cortex.

6. The method of claim 5, wherein the impaired vision is related to macular degeneration in the patient.

7. The method of claim 5, further comprising monitoring real-time information related to a location of the one or more electrode arrays from an imaging modality during advancement of the one or more electrode arrays to the location proximate the visual cortex.

8. The method of claim 7, wherein the imaging modality comprises at least one of fluoroscopy, computed tomography (CT), and angiography.

9. The method of claim 7, further comprising confirming a position of the one or more electrode arrays at the location proximate the visual cortex by the image of the electrophysiological information.

10. A method for minimally invasively treating impairment of movement in a patient, the method comprising:
    inserting one or more electrode arrays through an entry slit formed on the patient, wherein the one or more electrode arrays comprise stent-based electrode arrays;
    advancing the one or more electrode arrays through at least a subdural space along a cortical surface to a location proximate a target area in a brain of the patient;
    receiving, via the one or more electrode arrays, electrical signals of the brain;
    decoding the electrical signals to acquire electrical measurements of neural activity of the brain;
    determining an anatomical location of the one or more electrode arrays on the brain based on the electrical measurements of neural activity;
    displaying, via a display, an image comprising electrophysiological information corresponding to the anatomical location of the one or more electrode arrays; and
    deploying the one or more electrode arrays to the location proximate the target area, wherein the one or more electrode arrays are positioned and configured to perform at least one of stimulating the target area and recording electrical measurements from the target area.

11. The method of claim 10, wherein the impairment of movement is caused by a condition selected from the group consisting of: Parkinson's disease, Huntington's disease, essential tremor, ataxia, dystonia, an impulse control disorder, paralysis, stroke, spinal cord injury, and spinal cord degeneration.

12. The method of claim 10, further comprising monitoring real-time information related to a location of the one or more electrode arrays from an imaging modality during advancement of the one or more electrode arrays to the location proximate the target area.

13. The method of claim 12, wherein the imaging modality comprises at least one of fluoroscopy, computed tomography (CT), and angiography.

14. The method of claim 12, further comprising confirming a position of the one or more electrode arrays at the location proximate the target area by the image of the electrophysiological information.

15. The method of claim 10, wherein the one or more electrode arrays comprise at least about 200 microelectrodes.

16. The method of claim 10, wherein the one or more electrode arrays comprise at least about 500 microelectrodes.

17. The method of claim 10, wherein the one or more electrode arrays comprise at least about 1,000 microelectrodes.

* * * * *